(12) United States Patent
Buerger et al.

(10) Patent No.: US 7,454,909 B2
(45) Date of Patent: Nov. 25, 2008

(54) IMPEDANCE SHAPING ELEMENT FOR A CONTROL SYSTEM

(75) Inventors: Stephen P. Buerger, Albuquerque, NM (US); Neville Hogan, Sudbury, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 207 days.

(21) Appl. No.: 11/349,059

(22) Filed: Feb. 7, 2006

(65) Prior Publication Data
US 2006/0180225 A1    Aug. 17, 2006

Related U.S. Application Data

(60) Provisional application No. 60/651,087, filed on Feb. 8, 2005.

(51) Int. Cl.
*F15B 7/10* (2006.01)
*F15B 9/00* (2006.01)

(52) U.S. Cl. .............................. 60/553; 91/4 R; 623/26

(58) Field of Classification Search .................. 60/475, 60/553, 592; 91/4 R, 4 A, 385, 386, 387, 91/388, 389; 92/85 B; 623/26
See application file for complete search history.

(56) References Cited

U.S. PATENT DOCUMENTS

| | | | |
|---|---|---|---|
| 3,063,470 A * | 11/1962 | Forster | .......................... 92/90 |
| 4,431,422 A | 2/1984 | Hall | |
| 4,595,371 A | 6/1986 | Heston | |
| 4,661,039 A | 4/1987 | Brendholt | |
| 4,671,380 A * | 6/1987 | Henderson et al. | .......... 181/233 |
| 4,698,035 A | 10/1987 | Ferguson | |
| 4,782,258 A | 11/1988 | Petrosky | |
| 4,784,042 A | 11/1988 | Paynter | |
| 4,864,823 A | 9/1989 | Ikejiri et al. | |
| 4,876,906 A | 10/1989 | Jones | |
| 5,021,064 A | 6/1991 | Caines | |
| 5,080,000 A | 1/1992 | Bubic | |
| 5,276,390 A | 1/1994 | Fisher et al. | |
| 5,409,410 A | 4/1995 | Bohlin | |

(Continued)

FOREIGN PATENT DOCUMENTS

EP    0 773 135    5/1997

(Continued)

OTHER PUBLICATIONS

PCT Search Report & Written Opinion of the ISA for PCT/US2006/007067 dated Jul. 10, 2006.

(Continued)

*Primary Examiner*—Thomas E Lazo
(74) *Attorney, Agent, or Firm*—Daly, Crowley, Mofford & Durkee, LLP

(57) ABSTRACT

An impedance shaping element (or more simply, an impedance shaper) physically alters or shapes the mechanical impedance of a drive system as it appears from an interface and facilitates use of feedback control to improve performance by altering or shaping a dynamic coupling between an interface and a control system. For example, the impedance shaper can be used to adjust a coupling value from a first value to a second different value. In one embodiment, an impedance shaper controls the compliance, damping and inertia characteristics of fluid within a fluid path.

21 Claims, 12 Drawing Sheets

U.S. PATENT DOCUMENTS

| | | | |
|---|---|---|---|
| 5,466,213 | A | 11/1995 | Hogan et al. |
| 5,477,675 | A | 12/1995 | Ingraham et al. |
| 5,513,867 | A | 5/1996 | Bloswick et al. |
| 5,650,704 | A | 7/1997 | Pratt et al. |
| 5,704,253 | A | 1/1998 | Book et al. |
| 5,732,741 | A * | 3/1998 | Shiery .................. 138/30 |
| 5,794,621 | A | 8/1998 | Hogan et al. |
| 6,109,304 | A * | 8/2000 | Wolf et al. ............... 138/30 |
| 6,123,108 | A * | 9/2000 | Chen et al. .............. 60/469 |
| 6,276,977 | B1 | 8/2001 | Trienen et al. |
| 6,524,147 | B1 | 2/2003 | Hundertmark |
| 6,645,252 | B2 | 11/2003 | Asai et al. |
| 6,742,643 | B2 * | 6/2004 | Nix et al. ................ 60/469 |

FOREIGN PATENT DOCUMENTS

| | | |
|---|---|---|
| GB | 1 212 227 | 11/1970 |
| GB | 2 354 752 | 4/2001 |
| WO | WO 03/060330 | 7/2003 |
| WO | WO 2004/011812 | 2/2004 |

OTHER PUBLICATIONS

Krebs et al.; "Robot-Aided Neurorehabilitation;" IEEE Transactions on Rehabilitation Engineering; vol. 6, No. 1; Mar. 1998; pp. 75-87.

Pratt et al.; Series Elastic Actuators, Intelligent Robots and Systems, Apr. 1995; Proc. Human Robot Interaction and Cooperative Robots Proceedings; pp. 399-406.

Bernzen; "New Experimental Results on Vibration Damping of a Hydraulically Actuated Flexible Robot;" Proceedings of 37th IEEE Conference on Decision & Control, Tampa, FL; Dec. 1998; #0-7803-4394-8/98; pp. 1575-1576.

Buerger et al.; "Actuation System With Fluid Transmission For Interaction Control And High Force Haptics;" U.S. Appl. No. 11/349,547; filed Feb. 7, 2006.

Buerger et al.; "Method For Controlling A Dynamic System;" U.S. Appl. No. 11/349,036; filed Feb. 7, 2006.

Dohring et al.; "Admittance Enhancement in Force Feedback of Dynamic Systems;" Dept. of Electrical Engineering and Computer Science, Case Western Reserve University, Cleveland, OH; IEEE Conference on Robotics & Automation; #5/7916/21827/0103558; pp. 110-117.

Hogan et al.; Robotics Automation Handbook, Chapter 19, Impedance and Interaction Control; ISBN #0-8493-1804-1; 2005; pp. 19-1 to 19-24.

Noritsugu et al.; "Application of Rubber Artificial Muscle Manipulator as a Rehabilitation Robot;" 1996 IEEE Int'l Workshop on Robot and Human Communication; #0-7803-3253-9/96; pp. 112-117.

3D Design & Development, Haptic Devices & Toolkits; SensAble Technologies; http://www.sensable.com/products/phantom_ghost/phantom.asp; 1 page.

"MIT and London Team Report First Transatlantic Touch;" Massachusetts Institute of Technology, MIT News Office; Oct. 22, 2002; http://web.mit.edu/newsoffice/2002/touchlab3.html; 3 pages.

Buerger et al.; U.S. Appl. No. 11/349,547, filed Feb. 7, 2006.

Buerger et al.; U.S. Appl. No. 11/349,036, filed Feb. 7, 2006.

Colgate; "The Control of Dynamically Interaction Systems;" Massachusetts Institute of Technology, PhD; Aug. 1988; pp. 1-298.

Good; "Local Interaction Control for Space Construction;" University of Colorado at Boulder; vol. 54/03-B of Dissertation Abstracts International; 1 page (Abstract only).

Wang et al.; "Pneumatic Chamber Nonlinearities;" Jouirnal of Applied Mechanics, Transactions ASME v53 n4; Dec. 1986; 1 page (Abstract only).

Office Action dated Feb. 5, 2007 from U.S. Appl. No. 11/349,547.

Notice of Allowance dated May 7, 2007 from U.S. Appl. No. 11/349,547.

Notice of Allowance dated Aug. 14, 2007 from U.S. Appl. No. 11/349,547.

Response to Office Action dated Feb. 5, 2007 from U.S. Appl. No. 11/349,547.

* cited by examiner

IMPEDANCE SHAPING ELEMENT FOR A CONTROL SYSTEM

CROSS-REFERENCE TO RELATED APPLICATIONS

This application claims the benefit of provisional application No. 60/651,087 filed on Feb. 8, 2005 under 35 U.S.C. §119(e) and is incorporated herein by reference in its entirety.

STATEMENTS REGARDING FEDERALLY SPONSORED RESEARCH

Not applicable.

FIELD OF THE INVENTION

This invention relates generally to fluid transmission systems and more particularly to fluid transmission control systems adapted to interface to mechanical systems including but not limited to haptic systems.

BACKGROUND OF THE INVENTION

As is known in the art, when it is necessary to coordinate interaction between two machines, issues related to control of the machines can arise.

Mechanical interaction with objects is arguably one of the fundamentally important robot behaviors. Many current robot applications require it. For example, mechanical interaction is essential for manipulation and the core task of assembly systems. Future robot applications such as versatile use of tools or close cooperation with humans may be enabled by improved control of mechanical interaction.

Interaction with the environment may serve sensory or motor functions (or both) and the most appropriate mechanical interaction is different for sensory or motor tasks. Mechanical interaction dynamics may be characterized by mechanical impedance, which may loosely be considered a dynamic extension of stiffness. Lower mechanical impedance reduces interaction forces due to encountering an unpredicted object, thereby protecting both the robot and any object it manipulates (interaction forces on each being opposite but equal). Using a human analogy, by this reasoning, tactile exploration and manipulation of fragile objects should evoke the use of our lowest-impedance limb segments and while we can (and routinely do) interact with objects using other body parts (the elbow, the knee, the foot, etc.) we naturally tend to use our fingers for gentle, delicate tasks.

Conversely, wielding an object such as a tool often requires it to be stabilized and that requires higher mechanical impedance. This is particularly important if the interaction between the manipulator and the object is destabilizing, as is the case for many common tools. Again using a human analogy, consider, for example, the simple task of pushing on a surface with a rigid stick. If force is exerted on the stick normal to the surface, then the stick is statically unstable; small displacements from the configuration in which stick axis and force vector co-align result in torques that act to drive the stick further from that configuration. Success at this task requires a stabilizing mechanical impedance and because pushing harder exacerbates the problem (the magnitude of the destabilizing torque is proportional to the applied force) the minimum required impedance grows with the force applied. Simple though this task may be, it is an essential element of the function of many tools (e.g., screwdrivers, power drills, etc.) and any manipulator—human or robotic—must provide a stabilizing mechanical impedance to operate them.

In other applications, a robot's interactive behavior may be the main objective of control. For example, to use a robot to serve as a force-reflecting haptic display or to deliver physiotherapy requires intimate physical interaction with humans. In these applications, the "feel" of the robot becomes an important performance measure, and "feel" is determined by mechanical interaction dynamics. Versatile interaction with objects (whether tools or humans or other robots) therefore requires an ability to modulate and control the dynamics of interaction.

Traditional haptic devices are used as interfaces for computers, surgical simulations, as controls for tele-operating robots, and have recently been used in the first trans-oceanic "touch." These devices, however, necessarily exchange very little power with the user, and therefore are not useful for other markets. High force haptic devices could be used to create versatile, programmable exercise machines, physically accurate vehicle simulators, rehabilitation and other medical robots and robots that can cooperatively assemble heavy and tight-fitting objects, in addition to higher-force, more realistic versions of the traditional applications. For example, higher force capabilities would provide a larger operational range for a computer interface, permitting a dramatic increase in the capacity to deliver information to and from a computer via force. The difficulty of assuring a stable exchange of power while providing a desired "feel" for systems that exchange significant power across ports of interaction with their environments has limited the use of such devices.

High impedance machines have been adapted to behave as if their actual impedance is lower using force feedback. The main problem with this artificial method is that it introduces instability when coupled to certain environments (contact or coupled instability). It is widely understood that this happens because beyond certain, very small force feedback gains, the system becomes non-passive, meaning that it is capable of delivering non-prescribed energy to the interaction port.

Recent work has shown that introducing an appropriately placed and sized dissipative element in parallel with a spring and in series between the manipulator and environment, can drain the energy that force-based control generates and passivate the system.

In view of the above, suffice it to say that a large class of applications, including robots that interact with humans, demands interactive robots with low mechanical impedance. The most direct approach is to design low-impedance hardware and use a simple impedance control algorithm; in fact, this is the recommended approach. However, intrinsically low-impedance hardware can be difficult to create, particularly with complex geometries and large force or power outputs. Most robotic devices have intrinsically high friction and/or inertia and the simple impedance control technique uses the robot actuators only to increase robot impedance. It does nothing to reduce intrinsic robot impedance. Considerable effort has been devoted to designing alternative controllers to reduce the apparent endpoint impedance of interactive robots.

SUMMARY OF THE INVENTION

In accordance with the present invention, an impedance shaping element (or more simply, an impedance shaper) physically alters or shapes the mechanical impedance of a drive system as it appears from an interface and facilitates use of feedback control to improve performance by altering or shaping a dynamic coupling between an interface and a control system. For example, the impedance shaper can be used to adjust a coupling value from a first value to a second different value. In one embodiment, an impedance shaper controls the apparent compliance, damping and inertia characteristics of fluid within a closed fluid path. In one embodiment, an impedance shaper is disposed in a closed fluid path of a control system and helps control the apparent compliance, damping and inertia characteristics of fluid within the closed fluid path.

It should be appreciated that the impedance shaper may be implemented in a variety of different ways. In one exemplary embodiment, the impedance shaper is provided from a housing having a cavity region adapted to be in fluid communication with a control system. The impedance shaper can include one or more baffles which dampen variations in fluid forces resulting from movement of fluid within the impedance shaper. The baffles maybe made adjustable such that they can form orifices (fluid passage) through which fluid flow. The fluid passages can be made smaller or larger, thereby acting as an energy sink which provides the damping function. It has been recognized, in accordance with the present invention, that proper placement of the damping element within the closed fluid path is important to achieve desired operation. The specific location of the damping element in any particular application depends upon a variety of factors including but not limited to the characteristics of the drive system and the mechanical system. The particular location at which to place the impedance shaper in any particular application may be selected in accordance with a variety of factors including but not limited to the characteristics of the particular mechanical systems coupled to each interface port, the particular shaping characteristics provided by the impedance shaper for that application and the physical size, shape and weight of the impedance shaper.

In one embodiment, the baffles can form two or more compartments. Thus, the impedance shaper can have two or more disparate fluids therein (i.e. in the case where two compartments are formed, a first fluid can be in one compartment and a second fluid can be in the second compartment). The second fluid preferably has fluid characteristics which are different than the fluid characteristics of the first fluid. The second fluid may, for example, be provided as a compressible gas such as nitrogen. A compressible fluid provides a means to specify the compliance of the impedance shaper and thereby of an interface such as a haptic interface, for example. Compliance is one of the desirable properties of the interface impedance in certain applications, for example those involving interaction with humans.

Compliance can thus be adjusted by using two different fluids, one more compressible than the other, in two or even several chambers. For example, a fluid in one chamber might be hydraulic fluid, and a fluid in a second chamber might be air. The larger the section filled with air (the more compressible fluid), the more compliant the transmission. Alternatively, the compliance can be adjusted by selecting different materials for tubing which contains fluid, or by changing the way the fluid is constrained. The damping can be adjusted by changing the size of orifices that obstruct the fluid flow. With such techniques, the fluid system can be adapted to take on the mechanical characteristics of a spring and damper.

In one embodiment, the impedance shaper is provided having dynamic characteristics selected to reduce the apparent impedance of devices capable of providing significant power to an environment without sacrificing passivity and therefore guaranteeing stability. The impedance shaper stably achieves low impedance via designable and adjustable compliance and damping elements. Additionally, the impedance shaper can optionally include an arbitrary gear reduction element, as well as potential remote actuation for improved power/mass performance.

When utilized in an actuation system with fluid transmission for interaction control and high force haptics the impedance shaping element may be disposed anywhere along or within a closed fluid path, including adjacent first or second piston assemblies. Because the impedance shaper can be effectively contained in a hose (e.g. a flexible hose), a piston driven by an electromechanical source can remain substantially still, while the piston in contact with the environment moves in a space limited by the length of the hose. If such an actuation system is used as part of a serial robot linkage, one piston can be mounted as the actuator, and can receive power through a hose while one piston and a source remain stationary. Thus, rather than carrying the weight of an entire package, the linkage must only bear inertial and gravitational loads due to the piston and the hose, both of which can be made out of low-density material for minimal mass.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
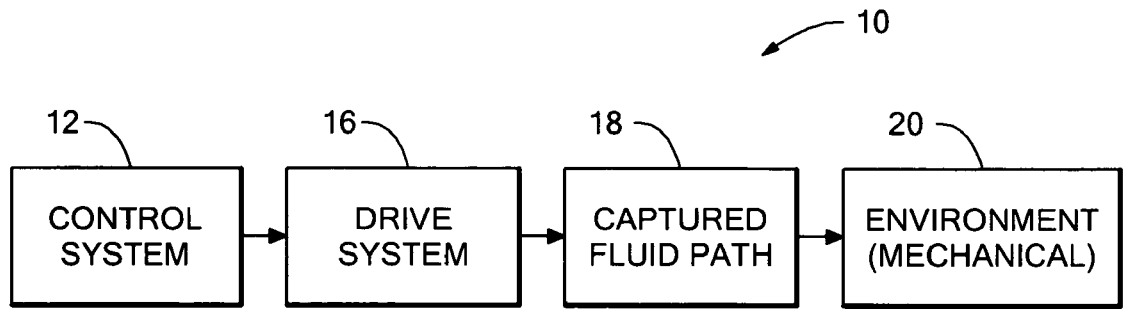
FIG. 1 is a block diagram of a fluid power system.

Before describing the figures, some introductory concepts and terminology are explained. The present invention relates to providing control of physical interaction between two mechanical systems. The two mechanical systems are sometimes referred to herein as an "interface" and a "drive system." It should be appreciated that the terms "interface" and "drive system" are not intended to be and should not be construed as limiting. Rather, those terms are merely used to promote clarity and understanding in the description. It should be appreciated that the concepts described herein are applicable to any types of mechanical systems regardless of use of the terms interface or drive system.

Reference is also sometimes made herein to a so-called "captured fluid path." A captured fluid path (sometimes also referred to herein as a "closed path") is a fluid path which contains a given mass of a fluid (also sometimes referred to as a "captured fluid mass"). The fluid may be moved in different directions within the path using a variety of different techniques as will become apparent from the description hereinbelow.

Reference is also sometimes made herein to a so-called "impedance shaper" (also sometimes referred to as "impedance shaping elements"). An "impedance shaper" serves two functions: first, to physically alter or shape the mechanical impedance of the drive system as it appears from the interface, for example to bring it closer to a desired value; second, to facilitate greater use of feedback control to improve performance by altering or shaping the dynamic coupling between the interface and the control system.

It should be appreciated that the system and concepts described herein provide at least two distinct advantages in certain applications: (1) high force and high power at low weight and low impedance and (2) compatibility with environments that can't tolerate electromagnetic fields, such as magnetic scanning technology Referring now to FIG. 1, a controlled mechanical system 10 includes a control system 12 coupled to a drive system 16. The drive system 16 is coupled to a captured fluid path 18 which includes a captured fluid mass. The captured fluid path 18 is coupled to a mechanical environment 20. The captured fluid path 18 is provided having a characteristic such that it shields the control system 12 from undesirable interactions which can occur between the drive system 16 and the mechanical environment 20. In some embodiments, the mechanical environment 20 may be provided as a haptic system, a robotic system or other mechanical system.

The drive system 16 and captured fluid mass 18 form an actuation system which can incorporate remote power transmission, selective gearing and mechanical filtering into a single, integrated package so as to permit large interaction forces appropriate for use in applications such as haptic applications without sacrificing device backdrivability.

Figure 1A:
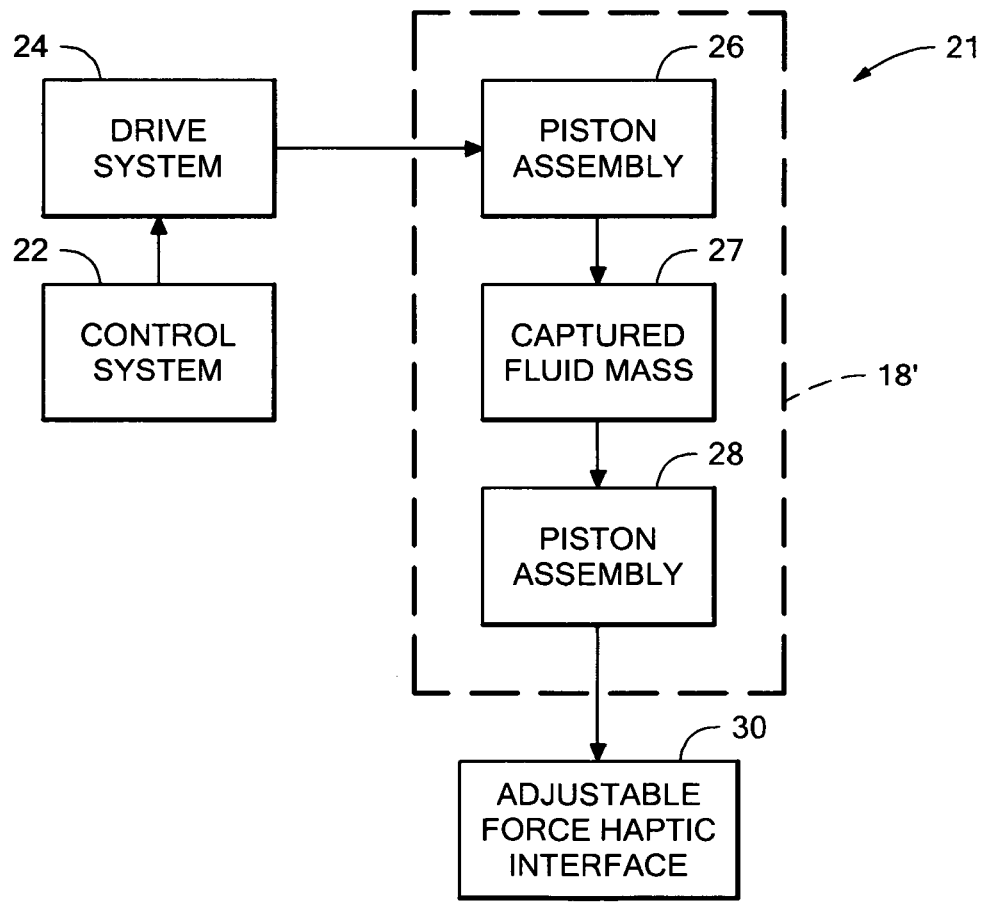
FIG. 1A is a block diagram of a fluid power system.

Referring now to FIG. 1A, a controlled mechanical system 21 includes a control system 22 coupled to a drive system 24. Drive system 24, in turn, is coupled to a captured fluid path 18'. In this exemplary embodiment, the captured fluid path 18' includes a first piston assembly 26 having a first port coupled to the drive system and having a second port coupled to a path comprising a captured fluid mass 27. A first port of a second piston assembly 28 is also coupled to the captured fluid mass 27 and a second port of the piston assembly 28 is coupled to an adjustable force haptic interface 30.

The characteristics of the drive system 24 and the captured fluid path 18' are selected to provide a system to appropriately control the haptic interface 30. Haptic interface 30 is but one example of the mechanical environment 20 described above in conjunction with FIG. 1.

In one embodiment, the system described herein relies on fluid elements such as a captured fluid mass 27 and a piston assembly 28 to transmit power to and generate force remotely at the haptic interface 30. Heavier elements, such as electromechanical actuators may remain stationary and do not move with the haptic interface. In one embodiment, the fluid elements are provided as lightweight fluid elements and the electromechanical actuators are provided as heavier elements.

With such an arrangement of lightweight fluid elements and stationary heavier elements, the system can achieve the low mechanical impedance typical of electromechanical technologies with the low weight and high force typical of fluid power technologies. Thus, the described closed fluid path facilitates the extension of haptics into so-called "high-force" and "high-power" applications. In the embodiment described herein, "high-force" and "high-power" refer to forces equal to or exceeding adult human body weight and power equal to or exceeding that of an adult human. However, higher force and power is achievable, limited only by the capacity of fluid power technologies.

Since the system described herein relies primarily on electromechanical actuators situated remotely from the haptic interface, the transmission of power from one end of the system to the other and exertion of force at the haptic interface does not require parts made of metals or other materials that would disrupt a magnetic field. Thus the system is suited for use in machines that can operate inside magnetic medical scanning equipment or in other environments in which an electromagnetic field cannot be present or where the presence of an electromagnetic field would not be desirable.

Figure 2:
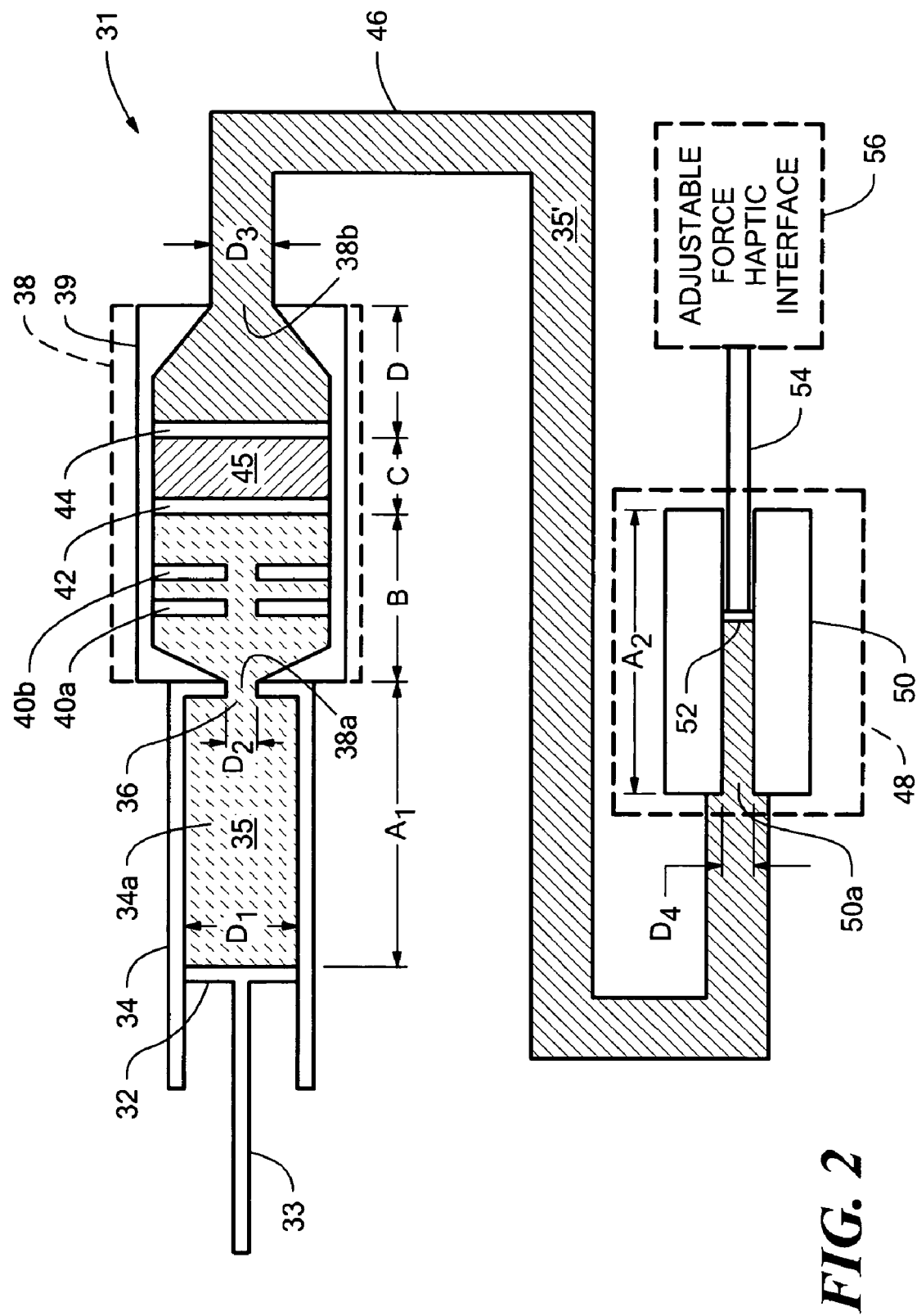
FIG. 2 is a schematic of a closed fluid path.

Referring now to FIG. 2, an exemplary captured fluid path 31, which may for example be appropriate for use in the system of FIGS. 1 and 1A, includes a first piston 32 having a first end of a piston rod or connecting member 33 coupled thereto. A second end of the piston rod 33 is adapted to be coupled to a drive system (e.g. one of drive systems 16, 24 described above in conjunction with FIGS. 1 and 2).

The piston is disposed in a piston cylinder 34 having an inner diameter D1. The cylinder housing 34 is provided having an opening 34a at an end hereof with a diameter D2. A first hydraulic fluid 35 is disposed within the piston cylinder 34. The piston 32 fits snugly within the cylinder such that the fluid does not leak between the piston and the cylinder wall. A piston ring or other means can be used to ensure an appropriate seal. The piston, connecting rod, and cylinder housing 34, together form a first piston assembly.

The opening 34a leads to an impedance shaper 38 which controls the compliance, damping and inertia characteristics of fluid within the closed fluid path.

It should be appreciated that the impedance shaper may be implemented in a variety of different ways. In the exemplary embodiment of FIG. 2, the impedance shaper 38 is provided from a housing 39 having a cavity region in fluid communication with the piston cylinder via a first port 38a. The impedance shaper includes one or more baffles (with two baffles 40a, 40b being shown in FIG. 2) which dampen variations in fluid forces resulting from movement of fluid within the impedance shaper 38. The baffles 40a, 40b are adjustable to make the orifices allowing fluid passage smaller or larger, thereby acting as an energy sink which provides the damping function. It has been recognized, in accordance with the present invention, that proper placement of the damping element within the closed fluid path is important to achieve desired operation. The specific location of the damping element in any particular application depends upon a variety of factors including but not limited to the characteristics of the drive system and the mechanical system.

The baffles 42, 44 form a compartment in which a second fluid 45 is disposed. It should be appreciated that in some embodiments, the baffles 42, 44 may be provided as slidable baffles which can move relative to the housing 39. The second fluid preferably has fluid characteristics which are different than the fluid characteristics of the first fluid 35. The second fluid may, for example, be provided as a compressible gas such as nitrogen. A compressible fluid provides a means to specify the compliance of the impedance shaper 38 and thereby of the haptic interface 56. Compliance is one of the desirable properties of the interface impedance in certain applications, for example those involving interaction with humans.

In one embodiment, the impedance shaper 38 is provided having dynamic characteristics selected to reduce the apparent impedance of devices capable of providing significant power to an environment (e.g. environment 20 of FIG. 1) without sacrificing passivity and therefore guaranteeing stability. The impedance shaper 38 stably achieves low impedance via designable and adjustable compliance and damping elements. Additionally, the impedance shaper can optionally include an arbitrary gear reduction element, as well as potential remote actuation for improved power/mass performance.

The impedance shaper is in fluid communication with a path 46 via a second fluid port 38b having a diameter D3. It should be appreciated that the second fluid port 38b is provided having a diameter which is different than the diameter of the first port 38a. In this exemplary embodiment, the diameter of the first port is shown as being smaller than the diameter of the second port. It should be appreciated, however, that in some embodiments the two diameters may be the same or the diameter of the first port may be larger than the diameter of the second port. Also, the shapes of each port described herein may all be different or may all be the same.

A third hydraulic fluid 35' is disposed with the path 46. The fluid 35' may or may not be the same as fluid 35. A second end of the fluid path 46 is coupled to an opening of a second piston assembly 4B. The piston assembly has a cylinder housing 50 having a cavity with a diameter $D_4$ and a length A and in which a piston 52 is disposed. A first end of a piston rod 52 is coupled to the piston and a second end of the piston rod is coupled to an adjustable force haptic interface 56, which is here shown in phantom since it is not properly a part of the captured fluid path 31.

It should be noted that the travel for each piston is designated by reference letters A1, A2 in FIG. 2. In the exemplary embodiment of FIG. 2, pistons 32 and 53 may travel different distances A1, A2 and will if diameters D1 and D4 are different. It should be noted that the baffle portion of the impedance shaper 38 is provided having a length B, the trapped volume portion of the impedance shaper is provided having a length C and the remaining portion of the impedance is provided having a length D. The travel of each piston is determined by the design of the haptic interface, e.g., range of travel to be provided. Lengths B, C and D vary during operation.

By selecting the diameters $D_1$ and $D_4$, the path 31 can be provided having a particular gear ratio. The gear ratio is determined exclusively by diameters D1 and D4. Thus, the velocity at 54/velocity at 33=D1/D4 and Force at 54/Force at 33=D4/D1. Said another way: velocity at 54=(D1/D4)×velocity at 53 and Force at 54=(D4/D1)×Force at 33.

The captured fluid path 31 thus provides a fluid transmission system having impedance shaping and/or gear ratio functions which can be selected to permit large interaction forces in haptic and other applications. The system also allows for remote location of a mechanical power source (e.g. a drive system) from the port of interaction (e.g. an interface), which in some applications can improve the power-to-weight ratio of the interface. This allows the system to be utilized in so-called "high force haptics" applications and interactive robotics.

In this embodiment, the fluid provides compliance, damping, and geared transmission functions. The captured fluid path 31 has two ports of interaction with mechanical systems. One port of interaction is at the first piston assembly (via connecting member 33) and the second port of interaction is at the second piston assembly (via connecting member 54). A power source (a linear motor, for example) can be attached to the first piston assembly, and a mechanical environment (e.g. haptic interface 56) interacts at the other. The path 46 may be provided as a flexible hose which permits relative motion of the first and second piston assemblies.

By selecting the diameters $D_1$, $D_4$, the system can offer a range of desired gear ratios. Gearing is accomplished without the use of mechanical components that suffer from phenomena like backlash and nonlinear friction, which pose problems not only in stabilizing force feedback control loops but also in presenting a soft, even feel at the interaction ports. In this way the fluid transmission offers superior mechanical properties compared with conventional systems and a simple, unified design. Gear reduction permits the use of a broader range of actuators to suit specific applications, based on force, travel, size, and power requirements. Thus, selection of different diameters $D_1$, $D_4$ can be used to provide amplification or reduction of force.

Compliance can be adjusted by using two different fluids, one more compressible than the other, in several chambers. For example, fluid 35 in FIG. 2 might be hydraulic fluid, and fluid 45 might be air. The larger the section filled with air (the more compressible fluid), the more compliant the transmission. Alternatively, the compliance can be adjusted by selecting different materials for the tubing that holds the fluid, or by changing the way the fluid is constrained. The damping can be adjusted by changing the size of orifices that obstruct the fluid flow. Thus the fluid system takes on the mechanical characteristics of a spring and damper.

Although the impedance shaper 38 is here shown adjacent the first piston assembly, it should be appreciated that the impedance shaper may also be disposed anywhere along or within path 46, including adjacent the second piston assembly. Because the impedance shaper can be effectively contained in a flexible hose, the piston that is driven by an electromechanical source (e.g. piston 32 in the example of FIG. 2) can sit still, while the piston in contact with the environment (e.g. piston 52 in FIG. 2) moves in a space limited by the length of the hose. If this actuator is used as part of a serial robot linkage, the second piston 52 can be mounted as the actuator, and can receive power through the hose while piston 32 and the source remain stationary. Thus, instead of carrying the weight of the entire package, the linkage must only bear inertial and gravitational loads due to piston 52 and the hose 46, both of which can be made out of low-density material for minimal mass. The particular location at which to place the impedance shaper 38 in any particular application may be selected in accordance with a variety of factors including but not limited to the characteristics of the particular mechanical systems coupled to each interface port, the particular shaping characteristics provided by the impedance shaper for that application and the physical size, shape and weight of the impedance shaper.

If a backdrivable mechanical actuator is chosen as the source, the system as a whole is backdrivable also, as the fluid system can be driven in either direction. Force control is applied to further tailor the impedance, and the impedance shaper keeps the system stable for interaction.

FIGS. 3-9 below describe a variety of different embodiments of an impedance shaper.

Figure 3:
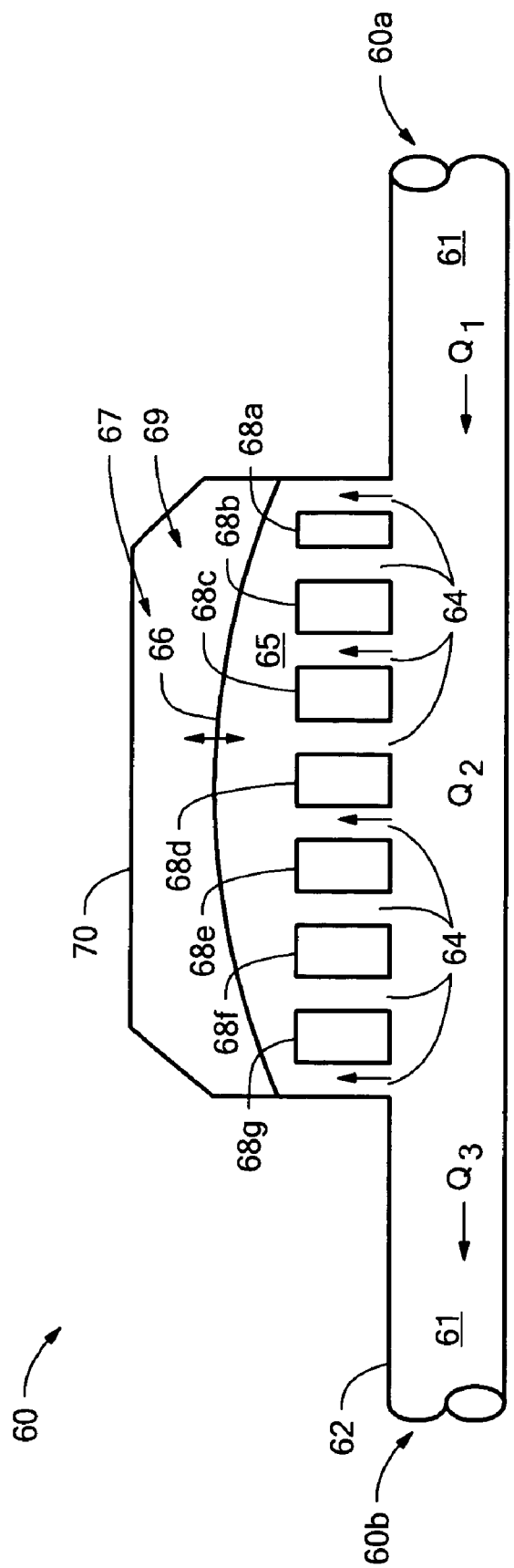
FIGS. 3-9 are series of diagrams illustrating different types of impedance shaping elements.

Referring now to FIG. 3, an impedance shaper 60 includes a first port 60a and a second port 60b and a baffle mechanism 70 comprised of a series of blocks 68a-68g, which define a plurality of openings 64a-64g. A membrane 66 forms a cavity region 67 in which a gas or other fluid 69 is disposed. Impedance shaper 60 may be used, for example, in place of impedance shaper 38 in the system described above in conjunction with FIG. 2.

When a first amount $Q_1$ of a first fluid 61 enters the tube 62 at port 60a, portions $Q_2$ of the fluid 61 flow through openings 64 formed by blocks 68a-68g of the baffle 70. The fluid portions $Q_2$ fill the baffle region 65 below membrane 66. The amount of fluid 61 which flows through openings 64 is determined by the stiffness of the membrane 66 and by the pressure due to loading conditions at 60a and 60b. The stiffness of the membrane 66 is determined by a variety of factors including but not limited to the stiffness characteristics of the particular material from which the membrane is provided, the amount of fluid 69 disposed in the cavity region 67, the compressibility characteristics of the fluid 69 relative to the compressibility characteristics of the fluid 61 and the shape and size of the membrane 66 and of the fluid cavity region 67. A second amount $Q_3$ of fluid 61 exits tube 62 at port 60b.

In one embodiment, the fluid 61 is provided as an incompressible fluid (e.g. water), while the fluid in region 67 is provided as a compressible fluid such as gas. It should be noted that this impedance shaper 70 requires fewer seals compared with impedance shaper 38 discussed above in conjunction with FIG. 2. It should also be noted that the fluid damping is implemented in a manner which is different than that shown in the embodiment of the impedance shaper shown in FIG. 2. One difference is that whereas the impedance shaper 38 includes damping that retards the motion of the piston 32 or the piston 52 or both, depending on its location within the fluid transmission as discussed above, the impedance shaper 70 of FIG. 3 includes damping that retards only the relative motion of piston 32 and piston 52. In this way the impedance to motion of the interface piston 52 is minimized while at the same time the dynamic coupling between the interface piston 52 and the actuator piston 32 is shaped to facilitate high-performance feedback control. Thus the impedance shaper 70 provides a different influence on the stability of an associated control system.

Figure 4:
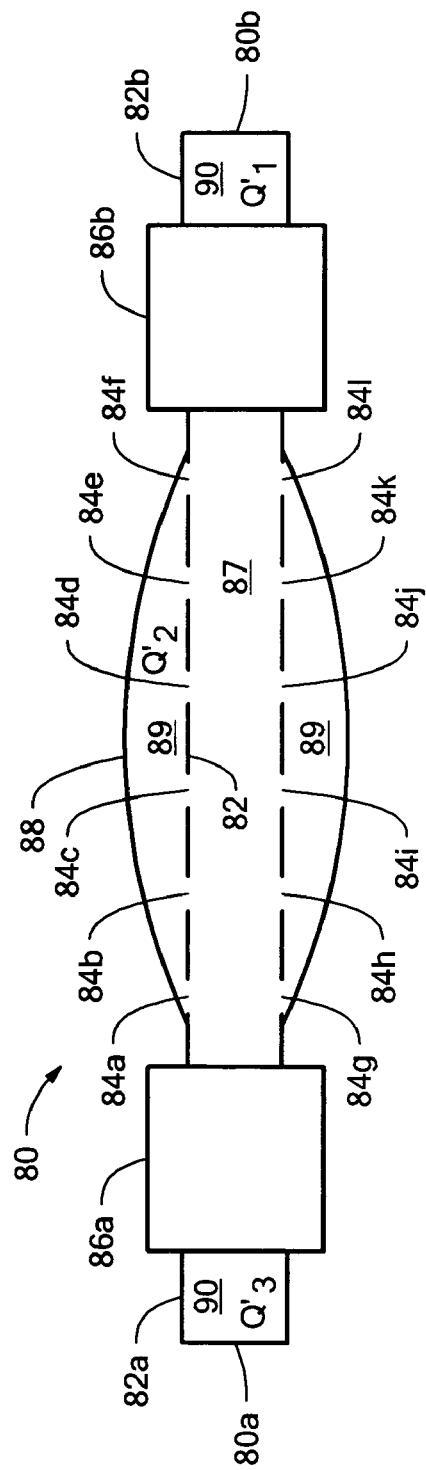
Figure 4A:
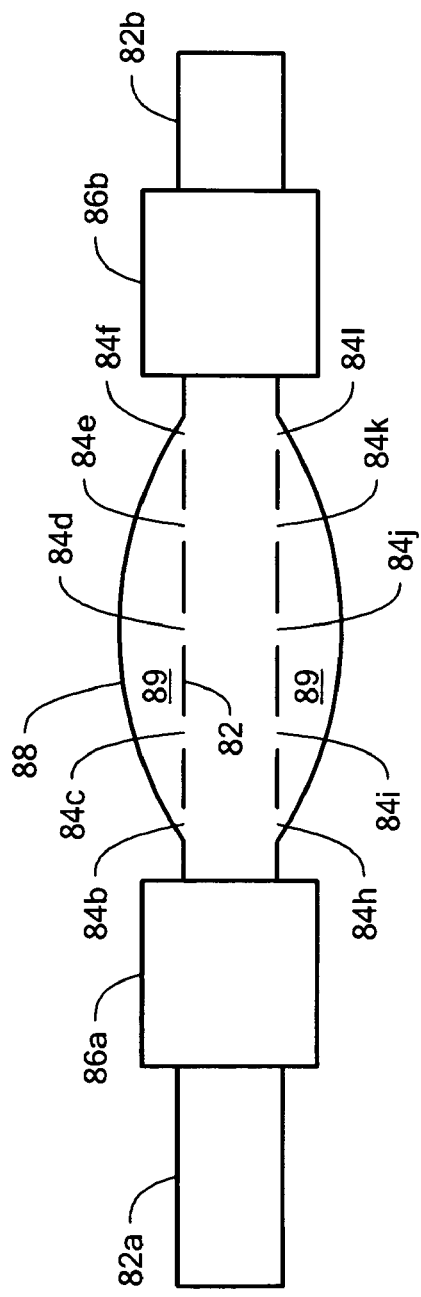

Referring now to FIGS. 4 and 4A in which like elements are provided having like reference designations, an impedance shaper 80 has a first port 80a and a second port 80b at respective first and second ends of a tube 82 having a plurality of apertures 84a-84l, generally denoted 84. Collars 86a, 86b are disposed over tube ends 82a and 82b and capture a membrane 88. The membrane 88 defines a space 89 in which fluid can move. The size of the space 89 depends upon a variety of factors including but not limited to the elasticity characteristic of the membrane.

In response to a first amount $Q_1'$, a fluid 90 entering tube 82 at port 82a, the fluid flows through the apertures into the space defined by the membrane 88. Thus, a portion $Q_2'$ of the fluid 90 flows through the apertures and resides in the space between the external walls of the tube 82 and the internal surface of the membrane 88. The elastic membrane 88 expands to accommodate the fluid which flows through the apertures 84. The expansion of the membrane creates a tension in the membrane which, in turn, increases the pressure in the fluid, thereby pushing fluid $Q_2'$ back through apertures 84 from whence it increases the force at the interface piston 52 and the actuator piston 33.

Referring now to FIG. 4A, collar 86a has been moved such that in FIG. 4A collar 86a shortens membrane 88 and covers apertures 86a and 86b which changes the fluid characteristics of the impedance shaper 80. In this particular example, collar 86a has been moved to cover apertures 84a, 84b and to reduce the amount of fluid which membrane 88 allows to flow out of tube 82. This can increase the amount of stiffness introduced into a system. For example, in the system of FIG. 2, if shaper 80 were used in place of shaper 38, then with collars 86a, 86b positioned as shown in FIG. 4, a person (or a mechanical system pushing on rod 33 (FIG. 2)) would feel a first amount of stiffness. However, if collars 86a, 86b were then positioned as shown in FIG. 4A, then a person (or a mechanical system pushing on rod 33 (FIG. 2)) would feel a second different amount of stiffness. In particular, the stiffness would be increased compared with the first stiffness. It should be appreciated that the membrane 88 may be provided from any number of materials and is selected in accordance with a variety of factors including anticipated load size (e.g. what is the largest load (force) at, for example, the interface piston 52 that can be supported without rupturing the membrane), desired stiffness levels, apparent stiffness of the fluids, stress levels, the length of the tube and the number of holes in the tube. It should be appreciated that in this embodiment only one mass of fluid exists (i.e. the same fluid fills tube 82 and space 89).

It should be appreciated that stiffness determines the force evoked by displacement. Apparent stiffness, e.g., at the interface, refers to the interface force evoked by the displacement of the interface, even though that stiffness may actually arise from stretching of the elastic membrane and/or compression of one or more of the fluids or some other source. Stress is the force per unit area applied to a material and is an important factor in determining failure.

Figure 5:
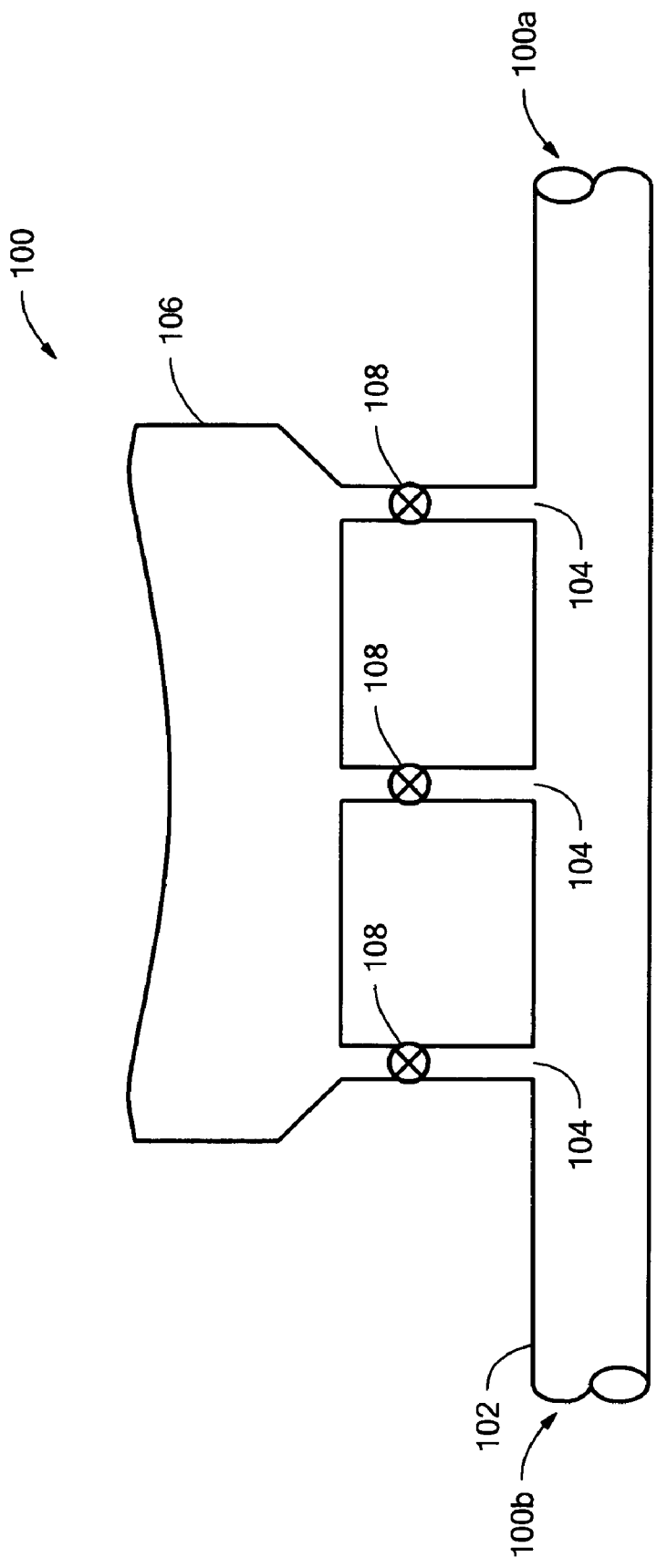

Referring now to FIG. 5, an impedance shaper 100 has a first port 100a and a second port 100b at respective first and second ends of a tube 102. One or more variable inertia and damping passages 104 couple tube 102 to a tank 106. The tank 106 acts as a stiffness shaper and in some embodiments could include a structure such as the membrane and holding structure of FIG. 4. Thus, the passages 104 and valves 108 provide inertia and damping and the tank provides stiffness.

In this particular embodiment, three openings 104 are shown, although those of ordinary skill in the art will appreciate that any number of openings, including one, can also be used. A series of valves 108 are disposed in the paths leading from tube 102 to tank 106. The valves can be closed to decouple the tank 106 from the tube 102. The captured fluid mass enters the tube and can propagate between the first and second ports 102a, 102b with variable inertia, damping and stiffness provided via the passages 104, valves 108 and tank 106, respectively. The membrane can be provided from an elastomer and the thickness of the elastomer material can be selected to endow the membrane with different characteristics. Thus, portions of the captured fluid mass within the system flow within the tube, paths, valves and tank.

It should be appreciated that the same fluid which flows into tube 102 also flows through paths 104 and into stiffness shaper tank 106. The valves 108 control the resistance to the fluid which can flow between the tube and the stiffness shaper. With all valves opened, a maximum rate and amount of fluid transfer can be achieved. By closing one or more of the valves, however, the amount and rate at which fluid can flow between the tube and the stiffness shaper tank is reduced (and if all valves are closed, no fluid can move between the tank and the tube). These changes alter the apparent inertia and damping of the fluid transmission system.

It should be appreciated that inertia determines the force evoked by acceleration and damping determines the force evoked by velocity. Apparent inertia or damping relates to inertia or damping as apparent stiffness relates to stiffness as described above.

Figure 6:
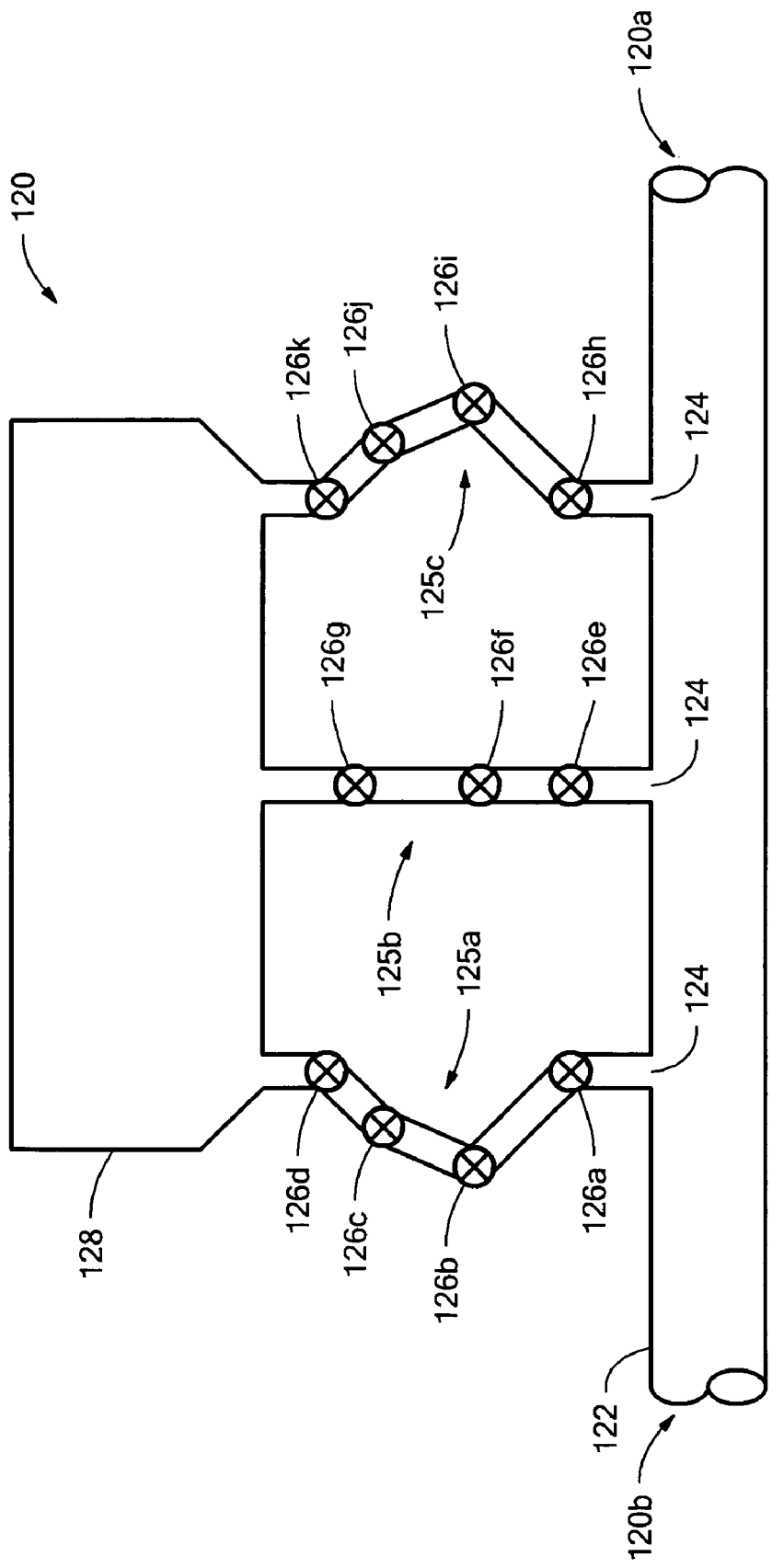

Referring now to FIG. 6, an impedance shaper 120 has a first port 120a and a second port 120b at respective first and second ends of tube 122 having a plurality of openings 124 provided therein. Each of the openings lead to a respective ones of paths 125a-125c having a series of valves 126a-126k disposed therein as shown. It should be appreciated that each of the paths 124 may have one or more valves provided therein. The paths 125a-125c each lead to a stiffness shaper 128. The stiffness shaper functions in a manner similar to that of stiffness shaper 106 described above in conjunction with FIG. 5. The length and diameter of each passage 125a-125c affects the damping and inertia of the system. That is, varying damping and inertia may be achieved by permitting extensive variation of the passage geometry which may be achieved by partially closing valves. If a valve is partially closed, the valve can increase damping without increasing inertia. A partially closed valve increases viscous losses and contributes to elevated damping but it does not affect the acceleration of a significant amount of fluid, hence does not significantly affect inertia. Thus, each of the valves 126 may be provided as an adjustable valve.

It should be appreciated that each path 125a, 125b, 125c may be provided having a length and diameter which is the same or different. The length and diameter of the paths can be adjusted by replacing existing paths with new paths having different characteristics (e.g. different lengths, different diameters, etc. . . . ). This changes both damping and inertia. By varying the fluid path geometry, a range of combinations of damping and inertia can be achieved.

Figure 7:
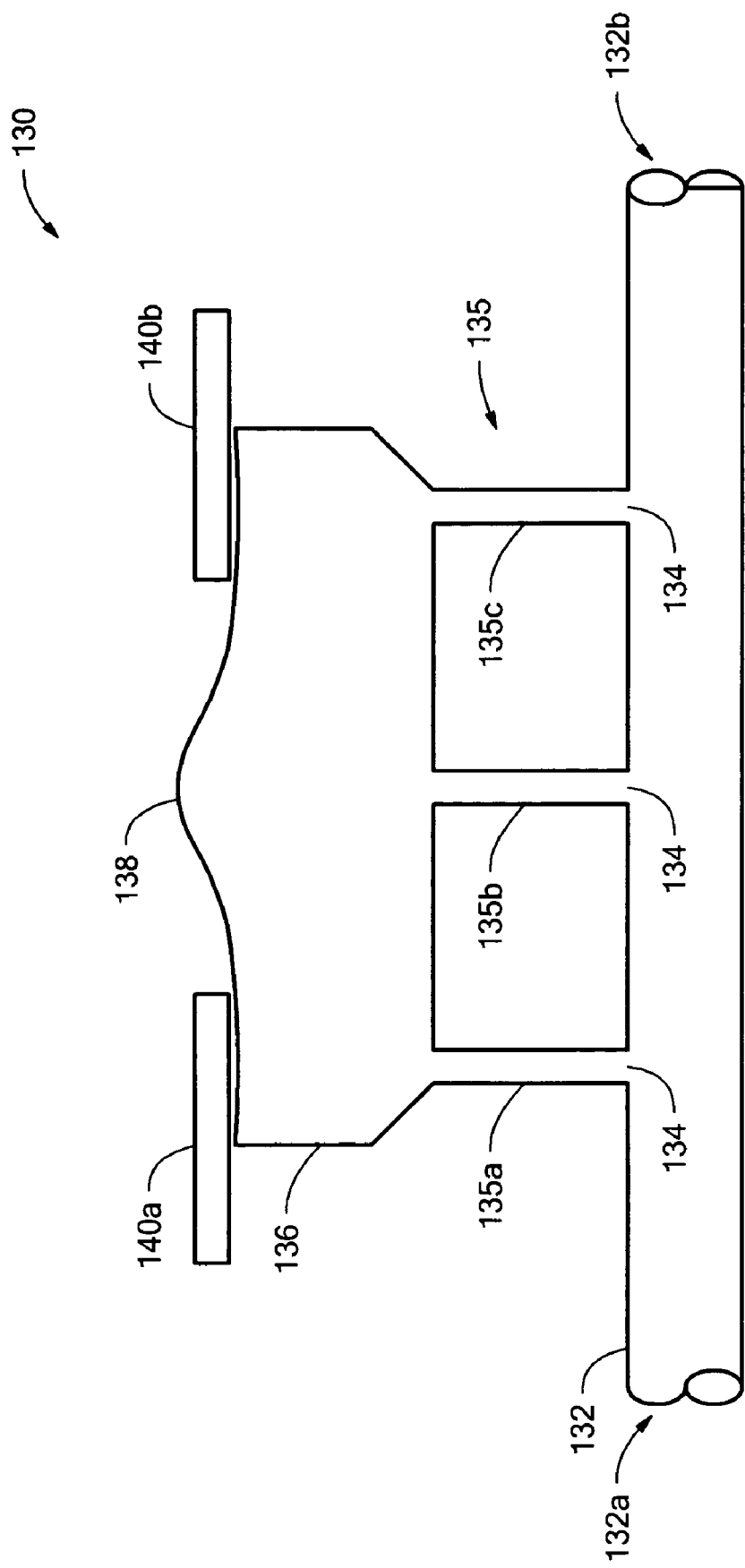

Referring now to FIG. 7, an impedance shaper 130 has a first port 132a and a second port 132b at respective first and second ends of a fluid path provided from tube 132 having a plurality of openings generally denoted 134 provided therein. Each of the openings 134 leads to a respective one of paths 135a-135c generally denoted 135. Paths 135, in turn, lead to a stiffness shaper 136. Each of the paths may be provided having the same or different path lengths and the same or different diameters and may optionally include valves as described above in conjunction with FIGS. 5 and 6. Stiffness shaper 136 may be provided as the type described above in conjunction with FIGS. 5 and 6, however, a flexible membrane 138 is disposed thereon. Members 140a, 140b block portions of the membrane 138. This allows separate control of inertia, damping and stiffness. Thus, by adjusting the position of the members 140a, 140b, the stiffness of the system may be adjusted. That is, a varying stiffness may be achieved by mechanically obstructing the flexible membrane 138. Thus, members 140a, 140b correspond to stiffness control elements.

Figure 8:
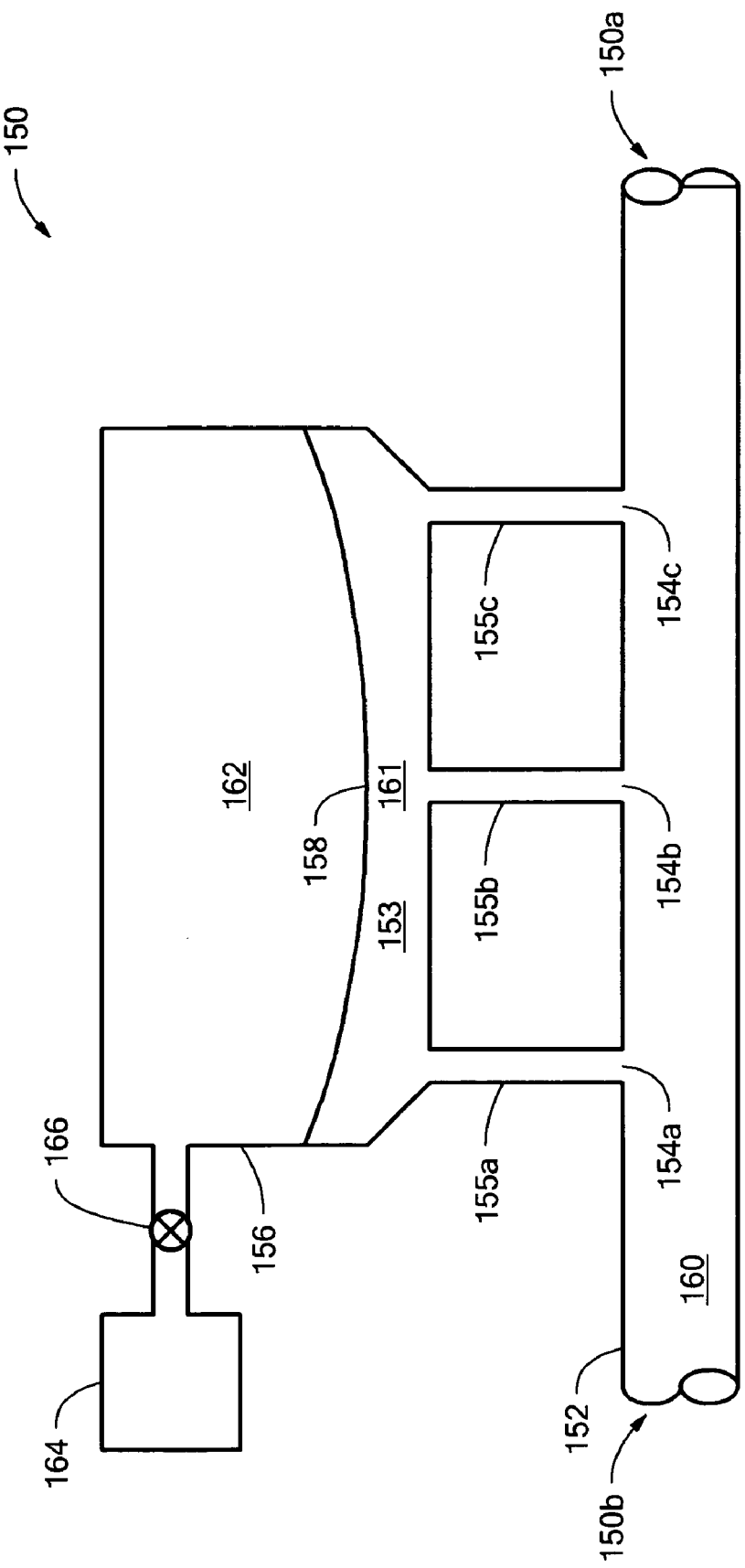

Referring now to FIG. 8, an impedance shaper 150 having a first port 150a and a second port 150b at respective first and second ends of a fluid path provided from a tube 152 having a plurality of openings 154a-154c, (generally denoted 154) provided therein. The openings 154 are connected via series of paths 155a-155c to a stiffness shaper 156. A membrane 158 is disposed in a portion of the stiffness shaper 156. A first fluid 160 in the fluid path flows through paths 155 to region 161 below the membrane 158 in the tank. A second fluid 162 resides above membrane 158. The fluid 160 (i.e. fluid below the membrane) is part of a captured system, while the fluid 162 is a separate fluid which is adjustable, e.g. such as a compressible gas. Fluid may be added or subtracted to the stiffness shaper 156, a gas and pressure volume adjustment system 164 coupled to the stiffness shaper above the membrane 158 via a valve 166. Thus, fluid may be added or subtracted from the stiffness shaper in the region above the membrane via the gas pressure and volume adjustment system 164 and the valve 166.

Figure 9:
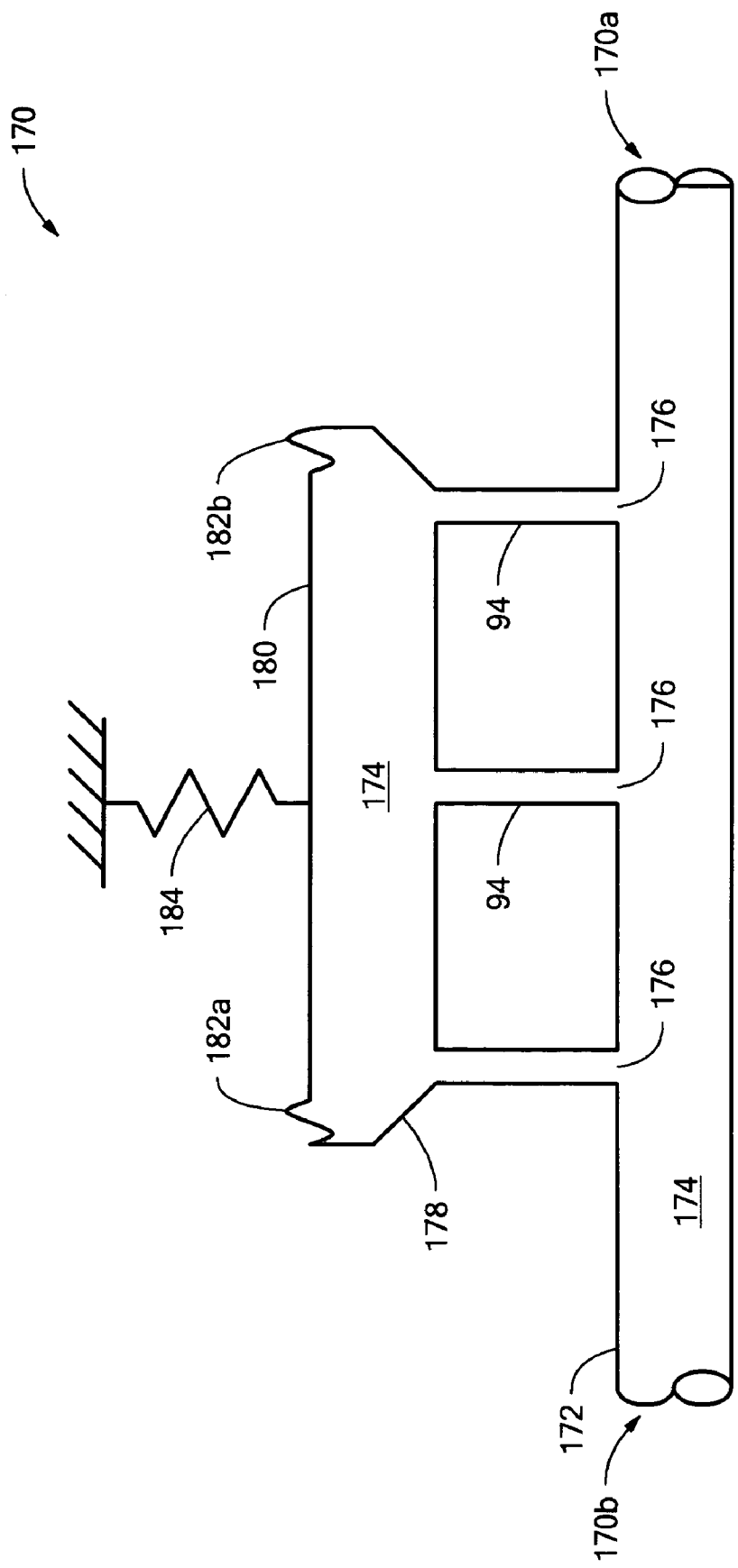

Referring now to FIG. 9, an impedance shaper 170 has a first port 170a and a second port 170b provided at respective first and second ends of a fluid path provided from a tube 172 having a plurality of openings 176 provided therein. The openings lead to paths 177 which couple path 152 to a stiffness shaper 178 having a diaphragm membrane 180 coupled thereto.

The diaphragm membrane has regions 182a, 182b which allow for movement of the diaphragm up and down within the region 174. A mechanical spring 184 is coupled to provide a source of stiffness to the stiffness shaper. Thus, rather than using a flexible membrane or an enclosed volume of gas as described above in conjunction with FIGS. 7 and 8, here a mechanical spring provides a source of stiffness, said stiffness being adjustable by using different springs.

Figure 10:
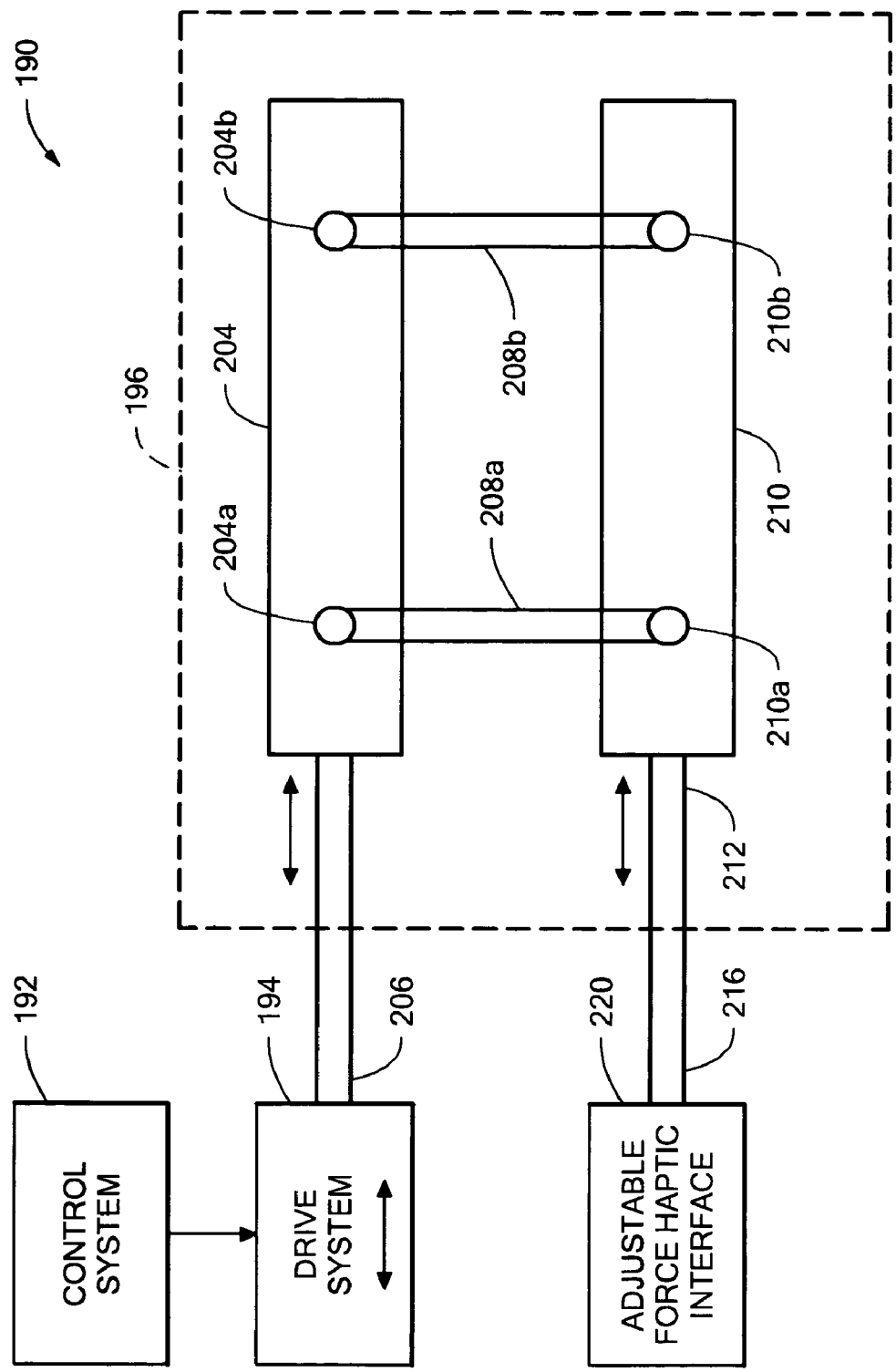
FIG. 10 is a block diagram and schematic of a system having dual fluid paths.

Referring now to FIG. 10, a system 190 includes a control system 192 coupled to a drive system 194. The drive system 194 is coupled through a captured fluid path 196 to an interface 220 which in this exemplary embodiment is shown provided as an adjustable force haptic interface 220. The captured fluid path includes a first piston assembly 204 coupled to the drive system 194 via connecting member 206. A pair of fluid paths 208a, 208b are coupled between the first piston assembly 204 and a second piston assembly 210. In particular, a first end of path 208a is coupled between port 204a on the first piston assembly and port 210a on the second piston assembly. Similarly, the second fluid path 208b is coupled between port 204b on the first piston assembly and port 210b on the second piston assembly.

In response to drive system 194 moving connecting member 206, a piston in the piston assembly 204 moves fluid within the piston assembly. In response to the movement of the connecting member 206 and fluid within piston assemblies 204, 210 and paths 208a, 208b, connecting member 216 moves within the adjustable force haptic interface 220. The reverse may also be true. That is, movement within environment 220 can result in movement of connecting element 206 and drive system 194. This assumes of course that drive system 194 and control system 192 allow bi-directional movement.

By having two fluid paths, the fluid in one path is always being "pushed" regardless of whether a piston is being pushed or pulled. By this means, the fluid is always in compression and the force that may be transmitted is not limited by ambient pressure.

Figure 11:
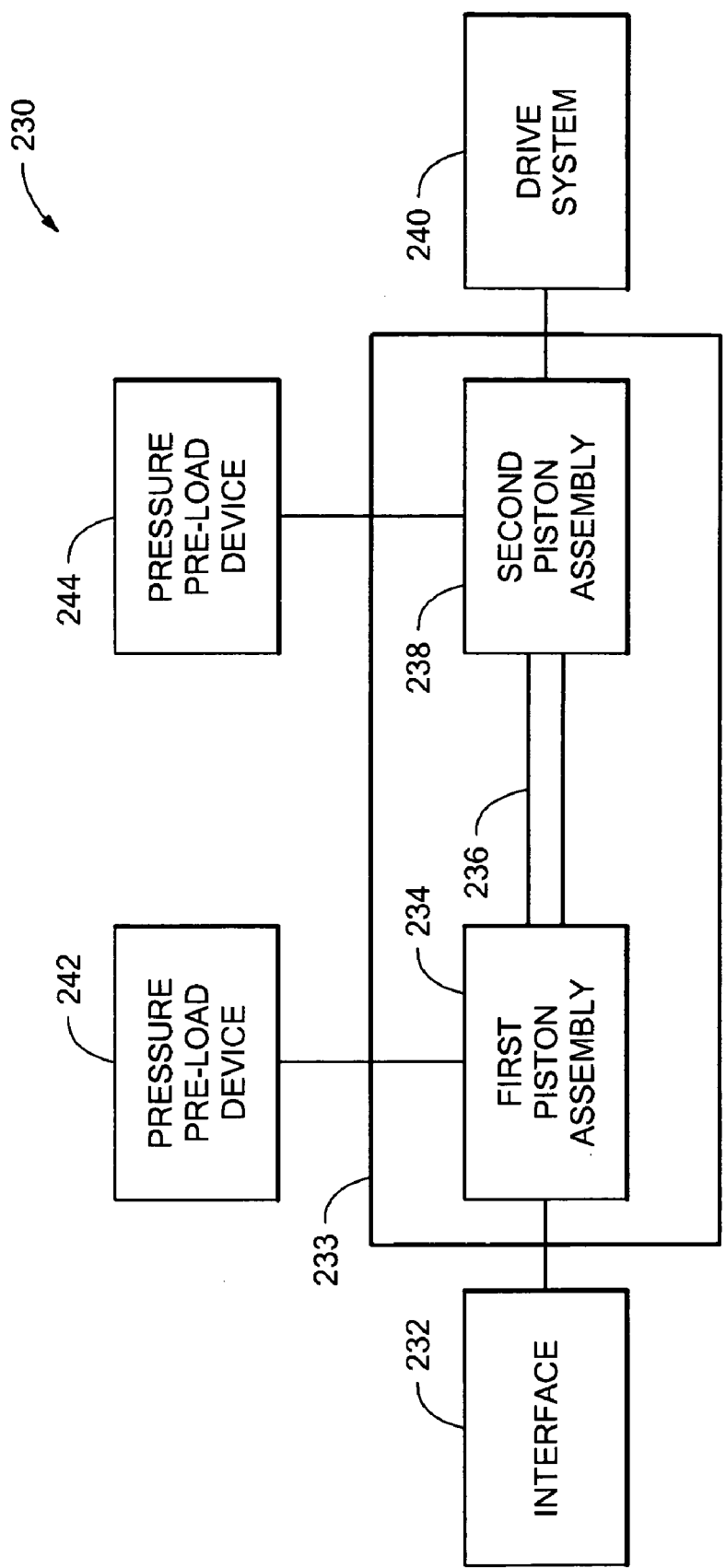
FIG. 11 is a block diagram of a system, which includes a pressure pre-load device.

Referring now to FIG. 11, a system 230 includes a first interface 232 coupled through a captured fluid path 233 to a drive system 240. The interface 232 and drive system 240 may be provided as any of the types of interfaces or drive systems discussed above in conjunction with FIGS. 1-10.

The closed fluid path includes a first piston assembly 234 coupled to the interface 232 and coupled through a fluid path 236 to a second piston assembly 238. The second piston assembly is coupled to the drive system. Each of the piston assemblies may be the same as or similar to the types discussed above in conjunction with FIGS. 1-10. Also, it should be appreciated that fluid path 236 may include an impedance shaper which may be the same as or similar to any of the impedance shapers described above in conjunction with FIGS. 3-9. For example, an impedance shaper could be disposed anywhere along path 236.

Pressure pre-load devices 242, 244 are coupled to respective ones of the pistons 234, 236. It should be appreciated, of course, that device 242 may alternatively be coupled to interface 232 (instead of or in addition to the first piston assembly). Similarly, the device 244 may alternatively be coupled to drive system 240 (instead of or in addition to the second piston assembly). Each of the pre-load devices 242, 244 applies a constant force which compresses fluid within the captured fluid path 233. The pressure must be equal on both sides of the pistons in the piston assembly. Thus, with no force applied by either the interface 232 or the drive system 240 and without the pre-load devices 242, 244, the fluid within the captured fluid path is at the ambient pressure of the environment in which the captured fluid path is disposed (e.g. atmospheric pressure).

With the pre-load devices 242, 244, the fluid within the captured fluid path is pressurized. Since there are forces applied on both piston assemblies, neither piston (and thus no fluid) is moving. However, the fluid is under a pressure which is higher than the pressure which would exist without the pre-load devices 242, 244. Thus, the preload devices 242, 244 provide a bias pressure. This allows each of the pistons within the piston assemblies to move in both directions. That is, the pre-load devices allow the interfaces 232 and drive system 240 to move the pistons in the respective piston assemblies 234, 238 by pushing or pulling on the pistons (e.g. via the respective connecting members).

Considering briefly the systems of FIGS. 1A and 2, it should be appreciated that these systems operate well when a force is applied to connecting member 33 or to connecting member 54 to "push" the respective pistons 32, 53 (i.e. to move piston 32 toward aperture 38a or to move piston 53 toward aperture 49). Thus, in one exemplary operating mode, piston 32 is pushed via a drive system toward aperture 36. In response to movement of piston 32, fluid within the impedance shaper 38 and fluid path 46 pushes piston 53 toward end 49b or cylinder 48.

Referring still to FIGS. 1A and 2, to return piston 32 to its first piston, (i.e. positioned proximate end 34a of cylinder 34) piston 52 is pushed toward end 50a of cylinder 48. It should be appreciated that it would be relatively difficult to "pull" piston 32 back to its initial position due to the existence of the fluid in the captured path. In particular, when the fluid is provided as a liquid, the mechanical force required to pull the piston 32 would result in the formation and collapse of low pressure bubbles in the fluid (i.e. cavitation) which would limit the force that could be transmitted from the piston 32 to the piston 53. However, by providing the systems of FIGS. 1A and 2 with pre-load pressure via the pre-load devices such as shown in FIG. 11, it would be possible to both push and pull each of pistons 32, 52.

Figure 12:
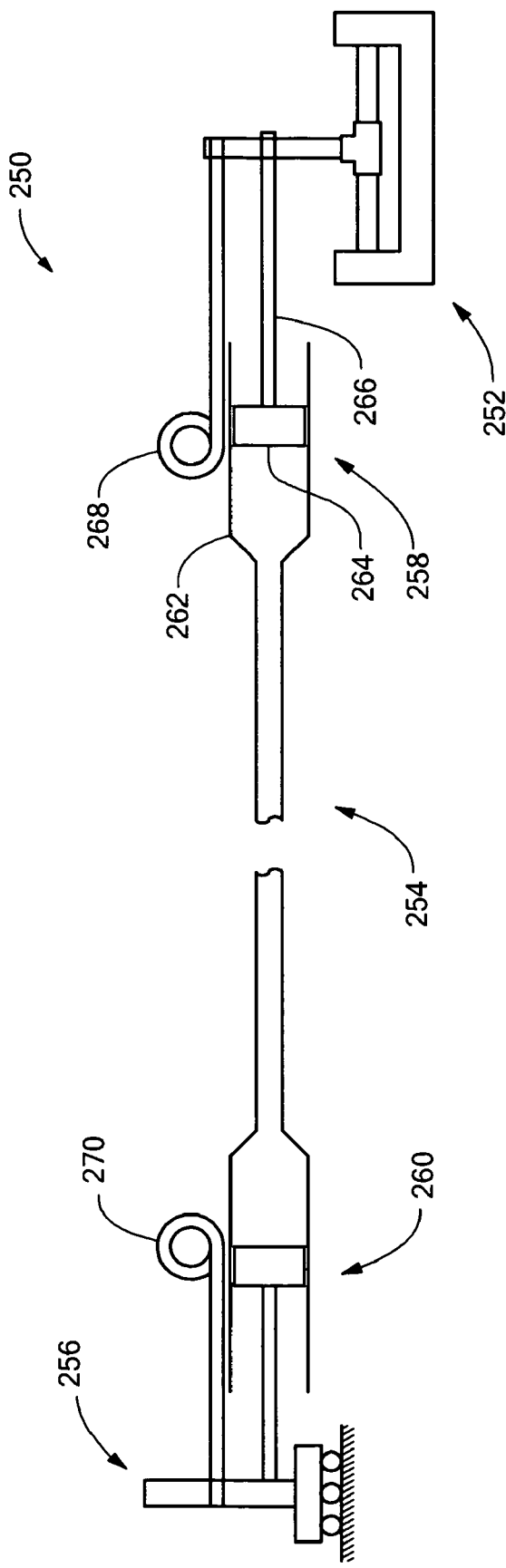
FIG. 12 is a schematic of a single-line assembly that can support tension and compression loads.

Referring now to FIG. 12, a system 250 which can support both tension and compression loads includes a drive system 252, a captured fluid path 254 and an interface 256. The drive system is here shown provided as a linear motor but any drive system which allows bi-directional movement may be used. The captured fluid path is provided from flexible fluid lines and includes first and second piston assemblies 258, 260. The first piston assembly includes a cylinder 262 having a piston 264 disposed therein. A connecting member 266 couples the piston to the drive system. A first pre-load system 268 is coupled to the drive system to provide a pre-load force on the piston and thus on the captured fluid mass within the captured fluid path. In this particular embodiment, the pre-load system is provided as a constant force spring coupled to the linear motor. The constant force spring exerts a spring force on the linear motor such that the linear motor exerts a force on the piston (via the connecting member) which in turn exerts a force on the fluid thus compressing the fluid within the captured fluid path. Thus, in this particular embodiment, the pre-load force corresponds to a spring force provided by the constant force spring.

Similarly, a second pre-load system 270 is coupled to the interface to provide a pre-load force on the captured fluid mass within the captured fluid path. In this particular embodiment, the interface corresponds to an adjustable force haptic interface. In general, however, the interface can correspond to any interface for any type of mechanical system. Also in this particular embodiment, the pre-load system is provided as a constant force spring coupled to the adjustable force haptic interface. The pre-load system exerts a force on the interface such that the interface exerts a force on the piston (via the connecting member) which in turn exerts a force on the fluid thus compressing the fluid within the captured fluid path.

By providing a constant force at both the interface and the drive system, the fluid mass within the captured fluid path is always being "pushed" regardless of whether the drive system or interface pistons are being pushed or pulled, provided the applied tension (pulling force) is less than the applied constant force.

It should be appreciated that although the pre-load devices are here shown as constant force springs (i.e. springs in which the spring-force stays substantially constant with travel of the spring) other implementations of the pre-load devices are also possible. For example, the pre-load devices may be provided from non-constant force springs (i.e. springs in which the spring-force changes with travel of the spring). This approach would result in the bias pressure provided by the spring changing as the pistons (and thus interface and drive) moved.

In cases in which non-constant springs (or other structures) are used to provide the pre-load forces, then as a piston moved in a first direction, the force exerted by the pre-load device would decrease while if the piston moved in a second opposite direction, the force exerted by the pre-load device would increase.

Alternatively, it should be appreciated that if the drive system had sufficient authority, then the pre-load device could be omitted (i.e. if the drive system could add the amount of force provided by the constant force spring to the force provided by the drive system at all times, then the constant force spring could be omitted). The same is also true of the interface (i.e. if the interface had sufficient authority, then the pre-load device could be omitted). If the system were oriented in a vertical position, then gravity (or some other constant force providing means) could be used to provide the pre-load force. Thus, it should be appreciated that in some embodiments, each side of the system could include different types of pre-load devices (e.g. constant force or other means) while in other embodiments, one side of the system (e.g. the interface side) may include a pre-load device while the other side of the system (e.g. the drive system side) may not include a pre-load device. Thus, the force could be introduced by the control system (not shown in FIG. 12) or by the drive system in which case a separate pre-load device would not be needed. Thus, in some embodiments it may be desirable to provide the pre-load force via the interface or drive system itself (i.e. without the aid of a separate device such as a pre-load device). In other embodiments, it may be desirable to utilize a separate pre-load device on one portion of the system (e.g. either the interface or the drive system).

In preferred embodiments, the pre-load devices provide a substantially equal amount of force in each direction regardless of travel. It is also preferred to provide the pre-load devices having substantially matched force characteristics.

As mentioned above, the constant force springs provide a "pre-load" pressure. This pre-load pressure allows one to pull on the drive system which is normally difficult to do because of cavitation. Cavitation is avoided by use of the pre-load devices since the spring force on the drive system side compresses the fluid even when the drive system is not engaged. The opposite is also true. That is, the spring force on the interface side compresses the fluid even when the interface is not engaged. This allows one to move the interface by pulling which would otherwise be difficult or cause unwanted pockets of gas to form.

Having described preferred embodiments of the invention, it will now become apparent to one of ordinary skill in the art that other embodiments incorporating their concepts may also be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. An impedance shaping element for use in a transmission system, the impedance shaping element comprising:

a housing having first and second ports and a cavity region for accepting a fluid; and at least one adjustable compliance and damping element disposed in the housing.

2. The impedance shaping element of claim 1 wherein the housing holds a first fluid in a first portion of the cavity region and the impedance shaping element further comprises a compartment within the cavity region, the compartment adapted for holding a second fluid having one or more fluid characteristics which are different than the fluid characteristics of the first fluid.

3. The impedance shaping element of claim 1 wherein the cavity region is provided having plurality of compartments therein, each of the plurality of compartments adapted to hold a fluid therein.

4. The impedance shaping element of claim 3 wherein each of the plurality of compartments have fluids therein with at least two of the fluids having one or more different fluid characteristics.

5. The impedance shaping element of claim 1 wherein the damping element corresponds to a baffle.

6. The impedance shaping element of claim 1 wherein the housing is provided having a series of openings therein and the impedance shaping element further comprises a membrane which defines a second cavity region in the housing.

7. The impedance shaping element claim 6 wherein the damping element comprises a one or more blocks which define the plurality of openings in the housing.

8. The impedance shaping element of claim 6 wherein at least one of a gas or liquid fluid is disposed in the second cavity region.

9. The impedance shaping element of claim 1 wherein the housing is provided having one or more apertures provided therein and a membrane is disposed about the apertures to define a region into which fluid from the fluid path can move.

10. The impedance shaping element of claim 1 wherein said housing has coupled thereto at least one of:
a bladder;
a volume of pressurized gas;
an open volume of liquid exposed to gravity;
a bellows; or
a mechanical spring.

11. An impedance shaper for use in a transmission system, the impedance shaper comprising:
a housing having first and second ports and a cavity region for accepting a fluid; and
a damping element disposed in the housing, said damping element having one or more variable inertia and/or damping passages, each of the one or more variable inertia and/or damping passages having a first end coupled to the fluid path.

12. The impedance shaper of claim 11 further comprising a tank and at least one of the one or more variable inertia and damping passages having a second end coupled to the tank.

13. The impedance shaper of claim 12 wherein at least one of the one or more variable inertia and damping passages are provided having one or more valves provided therein.

14. The impedance shaper of claim 12 wherein the tank is provided having a membrane disposed thereon.

15. The impedance shaper of claim 12 wherein at least one of the one or more variable inertia and damping passages is provided having at least one orifice adapted to provide an adjustable size opening within the passage.

16. An impedance shaper comprising:
a fluid path having a first port and a second port and having a plurality of openings provided therein;
a plurality of paths, each of the paths having a first end coupled to one of the plurality of openings in the fluid path and a second end;
an adjustable stiffness shaper adapted to accept the second ends of the plurality of paths; and
a membrane disposed in a portion of the stiffness shaper.

17. The impedance shaper of claim 16 further comprising a gas and pressure volume adjustment system coupled to said stiffness shaper.

18. The impedance shaper of claim 16 further comprising a first fluid disposed in the stiffness shaper on a first side of the membrane and a second fluid disposed in the stiffness shaper on a second side of the membrane.

19. An impedance shaper comprising:
a fluid path having a first port and a second port and having a plurality of openings provided therein;
a plurality of paths, each of the paths having a first end coupled to one of the plurality of openings in the fluid path and a second end;
a stiffness shaper adapted to accept the second ends of the plurality of paths;
a membrane disposed in a portion of the stiffness shaper;
a first fluid disposed in the stiffness shaper on a first side of the membrane and a second fluid disposed in the stiffness shaper on a second side of the membrane wherein the fluid on the first side of the membrane is part of a captured system and the fluid on the second side of the membrane is a separate fluid which is adjustable.

20. An impedance shaper comprising:
a fluid path having a first port and a second port and having a plurality of openings provided therein;
a plurality of paths, each of the paths having a first end coupled to one of the plurality of openings in the fluid path and a second end;
a stiffness shaper adapted to accept the second ends of the plurality of paths;
a membrane disposed in a portion of the stiffness shaper;
a first fluid disposed in the stiffness shaper on a first side of the membrane and a second fluid disposed in the stiffness shaper on a second side of the membrane; and
a gas and pressure volume adjustment system coupled to said stiffness shaper, said gas and pressure volume adjustment system adapted to add or subtract fluid to/from the stiffness shaper.

21. The impedance shaper of claim 20 wherein said gas and pressure volume adjustment system is adapted to add or subtract fluid from the stiffness shaper in the region above the membrane.

* * * * *

UNITED STATES PATENT AND TRADEMARK OFFICE
CERTIFICATE OF CORRECTION

PATENT NO. : 7,454,909 B2  Page 1 of 1
APPLICATION NO. : 11/349059
DATED : November 25, 2008
INVENTOR(S) : Buerger et al.

It is certified that error appears in the above-identified patent and that said Letters Patent is hereby corrected as shown below:

Col. 2, line 42-43, delete "passivate" and replace with -- passivates --.

Col. 3, line 17, delete "maybe" and replace with -- may be --.

Col. 3, line 18, delete "passage)" and replace with -- passages) --.

Col. 3, line 45, delete "thereby of an interface" and replace with
-- thereby an interface --.

Col. 5, line 8, delete "technology" and replace with -- technology. --.

Col. 7, line 5, delete "embodiments the" and replace with -- embodiments, the --.

Signed and Sealed this

Twenty-fourth Day of November, 2009

David J. Kappos
*Director of the United States Patent and Trademark Office*